FIG.1

Sept. 14, 1965 J. M. TOPAZ 3,205,804
SHUTTER TIMING APPARATUS
Filed March 29, 1963
2 Sheets-Sheet 2

INVENTOR.
Jeremy M. Topaz
BY Brown and Mikulka
ATTORNEYS

United States Patent Office 3,205,804
Patented Sept. 14, 1965

3,205,804
SHUTTER TIMING APPARATUS
Jeremy M. Topaz, Brighton, Mass., assignor to Polaroid Corporation, Cambridge, Mass., a corporation of Delaware
Filed Mar. 29, 1963, Ser. No. 268,914
18 Claims. (Cl. 95—55)

This invention relates to automatic control of photographic exposures and more particularly to novel means for reducing errors in automatically controlled exposures which arise from delays between changes in the intensity of light from the scene being photographed, and resulting changes in an electrical property of a photoresponsive element which is incorporated in the control device.

Many photographic cameras today are provided with means for automatically controlling the exposure value of the shutter in accordance with the brightness of the scene being photographed. Conventionally, a photosensitive element, having an electrical property which is functionally related to the intensity of light incident thereon, is arranged to receive light from the scene being photographed and is incorporated in an electrical circuit, the output of which is at least partially controlled by the variable electrical property of the element. Various known means may be provided for making the exposure control elements of the shutter responsive to the circuit output.

A large number of materials are presently in use, or under development, as light measuring devices which are incorporated in an electrical circuit to establish the exposure value of a photographic shutter. The characteristics of the photoresponsive device depend largely on the photosensitive material used. Certain features are essential and others desirable for such devices which are used for photographic exposure control. The features of the device finally selected for a particular application usually represent a compromise to achieve the best possible combination of desired features while retaining those which are necessary to the proper operation of the apparatus.

One of the characteristics of photoresponsive devices is commonly termed the "speed of response" and refers to the time required for the variable electrical property of the device to change to a new value in response to a change in light intensity. The speed of response varies considerably among the various types of photoresponsive devices, but is usually found to be significantly high among those devices used in normal photographic applications. The condition is especially evident when the level of illumination of the scene being photographed changes considerably while an exposure is being made and the exposure control apparatus is designed to reflect such changes. The most common instance of such variations in light level occur when the scene being photographed is illuminated by a transient light source designed to operate in cooperation with the camera shutter. Hereinafter, such lighting sources will be referred to as "photoflash apparatus," which term is intended to comprise the usual vaporizable filament flash bulbs as well as gaseous discharge tubes, tungsten filament bulbs to which a momentary overload is applied, and other such devices which are operable substantially to raise the level of scene illumination for a limited time.

It is therefore evident that errors will result in exposures which are controlled in some manner by the functional relationship between scene brightness and a variable electrical property of a photo-responsive cell, or the like, when the speed of response of the cell is slower than the rate at which the level of scene brightness changes while an exposure is being made. The exact nature and effect of such errors will be considered more fully in the detailed disclosure which follows, with reference to the accompanying drawings and graphs.

It is a principal object of the present invention to provide a photographic exposure control device which will automatically provide proper exposures when the scene being photographed is illuminated by light which changes appreciably in intensity during exposure as well as when the scene is illuminated by light of substantially constant intensity.

A further object of the invention is to provide automatic timing control means for a photographic shutter which includes means for reducing or eliminating errors which otherwise result due to the speed of response of a photosensitive element which is a part of the control means.

Another object is to provide exposure control apparatus which includes means for adjusting the electrical characteristics of a circuit, the output of which controls exposure variables, so that proper exposures will be provided thereby in accordance with the light received from the scene being photographed whether such light be substantially constant or changing in intensity.

A still further object of this invention is to provide a method for using a camera of the type described such that correct exposures can be achieved when the light from a scene being photographed is either substantially constant or transient in nature during an exposure.

Other objects of the invention will in part be obvious and will in part appear hereinafter.

The invention accordingly comprises the apparatus possessing the construction, combination of elements and arrangement of parts which are exemplified in the following detailed disclosure, and the process involving the several steps and the relation and order of one or more of such steps with respect to each of the others; and the scope of the application of which will be indicated in the claims.

For a fuller understanding of the nature and objects of the invention, reference should be had to the following detailed description taken in connection with the accompanying drawings wherein.

Figure 1:
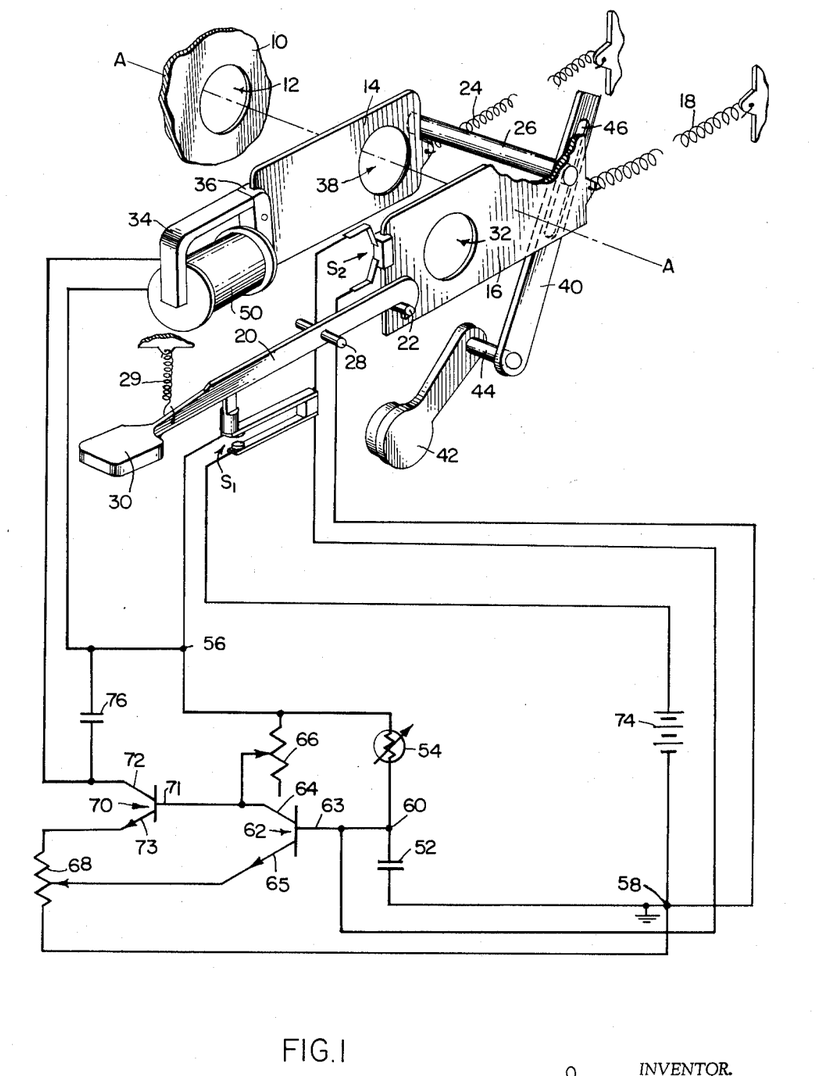
FIGURE 1 is a diagrammatic, fragmentary perspective view of means defining an exposure aperture and shutter means movable with respect thereto to effect photographic exposures, coupled with a schematic circuit diagram of suitable electronic means for controlling the duration of exposures of the shutter and wherein the present invention may be employed.
Figure 2:
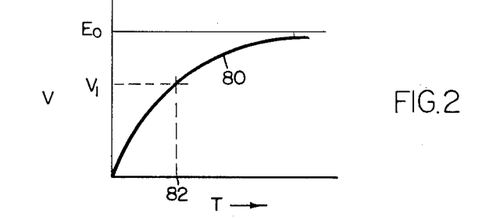
FIG. 2 is a graphical representation of one example of the change in voltage with respect to time at an output terminal of the circuit of FIGURE 1.

The present invention will be discussed in connection with a typical photographic shutter having a light-integrating switching circuit adapted to control the duration of exposures effected by the shutter. Although the shutter mechanism and circuit of FIGS. 1 and 2 are typical of the type of device wherein the present invention is suited for use, it will be understood from the following description that there are other types or configurations of the exposure control devices wherein the invention may be employed. For this reason, the shutter mechanism is shown in FIGURE 1 with a minimum of detail.

Referring now to the drawings, in FIGURE 1 is seen a fragment 10 of a shutter housing, lens board, camera body or other such means commonly used to define an exposure aperture 12, having a centrally-disposed axis A—A. A pair of shutter blades 14 and 16 are slidably mounted upon a suitable support means (not shown) for movement relative to aperture 12. As shown in FIGURE 1, the elements of the shutter are in the set or cocked position. Blade 16 is retained in the cocked position against the bias of spring 18 by latch 20, which engages pin 22 on blade 16. Blade 14 is retained in the cocked position against the bias of spring 24 by contact of a leading edge of blade 14 with bar 26 which extends rigidly from blade 16. Latch 20 is mounted for pivotal movement about pin 28 and is biased toward its latching position by spring 29. Manual depression of end portion 30 rotates latch 20 until it disengages pin 22. Blade 16 is thus allowed to move to a second position (not shown) wherein opening 32 is in alignment with axis A—A. Blade 14 is retained in the position of FIGURE 1 by the attractive force exerted by electromagnet 34 on a magnetizable element or keeper 36 which is fixedly attached to the trailing edge of blade 14. Electromagnet 34 is energized and deenergized to restrain and permit movement of blade 14 by the operation of the circuit, which will be explained later.

When blade 16 is in its second position and blade 14 is in its initial position, light from a scene being photographed is allowed to pass through exposure aperture 12, through opening 38 in blade 14, and opening 32 in blade 16 to impinge upon a photographic film or the like (not shown) for the purpose of effecting a photographic exposure. When electromagnet 34 is deenergized, blade 14 is allowed to move to a second position (not shown) wherein a solid portion of the blade is in alignment with axis A—A and blocks the passage of light through exposure aperture 12, thus terminating the exposure.

A cocking or reset mechanism is provided for returning the shutter elements to the position of FIGURE 1. The cocking mechanism is in the form of a crank having arms 40 and 42, extending rigidly from pivotally mounted pin 44. Arm 40 includes an elongated slot 46 which embraces bar 26. Thus, the crank will be rotated by movement of blade 16 to its second position. The unpivoted end of arm 42 may be manually counter-rotated to cause rotation of arm 40, and thus return movement of blade 16, against the bias of spring 18. Continued rotation of arm 42 returns both blades to the position of FIGURE 1 wherein they are again retained by latch 20. It will be noted that when blade 16 is held by latch 20, blade 14 is maintained by bar 26 in such a position that keeper 36 is in contact with the pole pieces of electromagnet 34.

The time for which the film is exposed by light entering through exposure aperture 12 is substantially the time between arrival of blade 16 at its second position and the movement of blade 14 to its second position. Since movement of blade 14 away from its initial position is controlled by electromagnet 34, the timing means for controlling exposure duration may comprise suitable means for deenergizing electromagnet 34 at the proper time after release of blade 16. In the embodiment illustrated in FIGURE 1 the timing means comprises a transistorized, modified, Schmitt-type trigger circuit for controlling a current supply through coil 50, which provides the energization of electromagnet 34. This circuit provides rapid switching of the current input to coil 50 and low power consumption.

The timing portion of the circuit comprises capacitor 52 connected in series with photoresponsive element 54, which may be any of a number of such elements conventionally used as light-measuring devices in photographic apparatus. For purposes of the present discussion, element 54 will be considered to be of the photoconductive type, such as a cadmium sulfide photoconductor, or the like, disposed to receive light from the scene being photographed and having a resistance functionally related to the level of scene brightness. Also, in order to simplify examples of circuit operation to be considered hereinafter, the electrical property of element 54 which is related to the intensity of light incident thereon may sometimes be spoken of as the resistance and at other times as the conductance, which is the reciprocal of the resistance.

The timing portion just described is connected, through switches to be later described, between terminals 56 and 58 so as to form a conventional integrator circuit whose input terminal is at 56, and whose output terminal is at 60, the connection between capacitor 52 and element 54. The response of this portion of the circuit to a step-function voltage input is a time-varying voltage output at terminal 60. Where there is no initial charge on capacitor 52, the time $t$ required for the voltage at terminal 60 to reach any preselected value $V_1$ is given by:

$$t = RC \ln \frac{1}{1 - \frac{V_1}{E_0}} \qquad (1)$$

where R is the resistance of the photoconductive element 54, as established by the intensity of light incident thereon, C is the capacitance of capacitor 52, and $E_0$ is the magnitude of the step-function voltage input.

The voltage-sensitive trigger circuit includes transistor 62 having base, collector and emitter electrodes 63, 64 and 65 respectively. Base electrode 63 is connected to terminal 60, the voltage output of the timing means. Collector electrode 64 is connected to terminal 56 through variable bias resistor 66, and emitter electrode 65 is connected to terminal 58 through variable bias resistor 68. A second transistor 70 includes base, collector and emitter electrode 71, 72 and 73 respectively. Collector electrode 72 is connected to terminal 56 through coil 50 and emitter electrode 73 is connected through bias resistor 68 to terminal 58, so that electromagnet 34 is energized when transistor 70 conducts. It should be noted that with this arrangement there is essentially a common emitter resistor 68, the adjustment thereof being for the purpose of establishing the voltage at which it is desired to trigger the circuit.

The circuit includes a source of electrical power, shown in the form of battery 74 of potential $E_0$, connected from terminal 56 to terminal 58 through switch S1, which is normally open to minimize current drain on battery 74. The contacts of switch S1 are closed by manual depression of end portion 30 of latch 20 which, as previously described, releases blade 16 to initiate exposure. The amount of movement of latch 20 required to close switch S1 is less than the amount required to release blade 16, so that the switch will always be closed before blade 16 begins to move, for reasons which will later become apparent.

The operation of the shuntter means in moving to initiate and terminate exposure, and the associated operation of the timing circuit to control the duration of the exposure, will now be described. As the operator depresses end portion 30, latch 20 moves to close the terminals of switch S1. Transistor 70 conducts almost instantaneously with the closing of switch S1 because at the instant of closing, the collector-base junction of transistor 70 is reverse biased, causing leakage current to flow through resistor 66, establishing a forward bias on the emitter-base junction. The setting of variable resistor 66 establishes the degree to which transistor 70 conducts so that the current through coil 50 can be adjusted to provide proper magnetomotive force in the magnetic circuit of electromagnet 34 to retain blade 14 in its initial position after blade 16 has moved away from its initial position. The flow of current through resistors 66 and 68 when transistor 70 conducts establishes at collector 64 and emitter 65 of transistor 62 bias voltages having first values dependent upon the magnitudes of the respective currents and resistance values.

As latch 20 continues to move after closing switch S1, pin 22 is disengaged, thus leaving blade 16 free to move under the bias force of spring 18. A pair of switch terminals are closed through a portion of blade 16, when the latter is in the cocked position, forming switch S2 which opens upon movement of blade 16 away from the cocked position. At the instant S1 is closed, and until switch S2 is opened the voltage at terminal 60 is ground potential. As above described, the timing means acts like a conventional integrator circuit. Thus, when a voltage is applied to input terminal 56 by closing switch S1, there appears at output terminal 60, upon opening of switch S2, a voltage which changes from an initial value (in the present example, ground potential) to a preselected value ($V_1$) in a period of time ($t$) dependent upon the value of capacitor 52 and the conductance of element 54 as established by the intensity of light received thereby from the scene being photographed. When the voltage at terminal 60 is at its initial value, and the voltages at collector 72 and emitter 73 are at their first values of bias voltage due to the conduction of transistor 70, the collector-base and emitter-base of transistor 62 are reverse biased, thus resulting in transistor 62 being cut off, or nonconducting. When the voltage at output terminal 60 reaches the preselected value $V_1$ which forward biases the emitter-base junction of transistor 62, the latter begins to conduct.

Initially, the increased collector current of transistor 62 flowing through bias resistor 66 increases the voltage drop thereacross to lower the voltage at base electrode 71 of transistor 70. This reduces the forward bias on transistor 70, decreasing the flow of current through the latter, causing the voltage drop across bias resistor 68 to decrease, thereby increasing the forward bias of transistor 62 even more. This regenerative feedback between the steps of the voltage-sensitive trigger circuit causes conduction to switch rapidly from transistor 70 to transistor 62. The different flow of current through bias resistors 66 and 68 due to this switching of transistor establishes second values of bias voltages at collector 64 and emitter 65 of transistor 62. Thus, the conduction of transistor 70 is severely and rapidly reduced by the second values of the aforementioned bias voltages, thereby rapidly deenergizing electromagnet 34 to effect release of blade 14 in the manner previously described. Capacitor 76, shunting coil 50, causes the transient current which flows through the coil to oppose the magnetizing current, sharply decreasing the magnetic induction in electromagnet 34 to zero, thereby accelerating the time required for spring 24 to overcome the magnetic attraction of electromagnet 34 and effecting a clean, sharp release of blade 14. To achieve this regenerative effect, the rapid decrease of current through coil 50 is essential.

Referring now to FIG. 2, curve 80 represents the manner in which the voltage (V) at terminal 60 (that is, the charge of capacitor 52) increases with respect to time (T) in response to the application of a step-function voltage, upon opening of switch S2. Curve 80 exponentially approaches $E_0$, the potential of battery 74, reaching the value $V_1$, the preselected trigger voltage, at the time represented by point 82. The rate at which the voltage V increases is dependent upon the values of the capacitance of capacitor 52 and the resistance, or conductance, of photocell 54 as determined by the light intensity. The product of these values (RC) is commonly known as the time constant and will be functionally related to the intensity of light received from the scene being photographed by photocell 54. Thus, the time required for the voltage to reach trigger voltage $V_1$ is determined by the time constant which in turn assumes a value dependent on the intensity of light received from the scene.

Figure 3A:
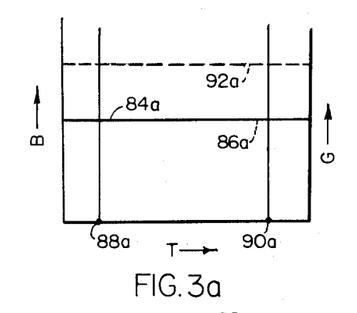
FIGS. 3a–3d are graphical representations of the intensity of illumination incident on a photoresponsive element and the corresponding changes in an electrical property thereof, both with respect to time.

FIG. 3a represents graphically the relationships between the intensity of light received by photocell 54 from the scene being photographed (B) and the resulting conductance (G) of photocell 54 with respect to time (T). The units for the values of light intensity and conductance are not shown, the values being plotted to any convenient scale which results in the equilibrium value of conductance for a given level of light intensity falling in the same point on the graph as that value of intensity. Consequently curve 84a, which represents a light intensity which is constant with respect to time, and curve 86a, which represents the value of photocell conductance corresponding to the intensity represented by curve 84a, are superimposed one upon the other. At the time represented by point 88a, an exposure is initiated by movement of blade 16 to its second position, and the timing operation of the circuit is initiated by opening of switch S2. The voltage at output terminal 60 thereupon begins to rise until it reaches the preselected trigger voltage, thus terminating the timing operation, and consequently the exposure. The time at which the timing operation and the exposure are terminated is indicated in FIG. 3a by point 90a. Although it is evident that some delay will be involved between initiation of timing and actual initiation of exposure with the physical shutter construction shown in FIGURE 1, such delay is of no importance in the present invention and will be ignored for the sake of brevity and simplicity. A delay will also occur between termination of the timing operation and actual termination of exposure by movement of blade 14 to the blocking position. The latter delay may conveniently be made equal to the former by appropriate shutter design, as is well known by those skilled in the art, whereby the actual exposure time, although beginning and ending slightly later, will be equal to the time interval established by the circuit. It is to be understood, however, that such construction is mentioned only by way of example and that proper synchronization between circuit and shutter operation may be obtained when the aforementioned time delays are of different duration.

The amount of light received by the film being exposed during the exposure interval may be expressed by the formula:

$$\int_0^t B\,dt \quad (2)$$

where 0 represents the time at which the circuit is actuated to begin timing and $t$ the time at which the circuit triggers, as calculated from Equation 1. Relating this to FIG. 3a, the integral of curve 84a between the time limits 88a and 90a will be the amount of light received during the exposure interval, and is referred to hereinafter as the "time-integral" of light intensity during the exposure interval. The integral of curve 86a between the limits 88a and 90a is referred to as the time-integral of photocell conductance during the exposure interval. The time required, after opening of switch S2, for the voltage to reach the trigger voltage may thus be expressed in terms of the time integral of photocell conductance. That is, the circuit will trigger when the area under the curve of conductance with respect to time reaches a predetermined value.

Figure 3B:
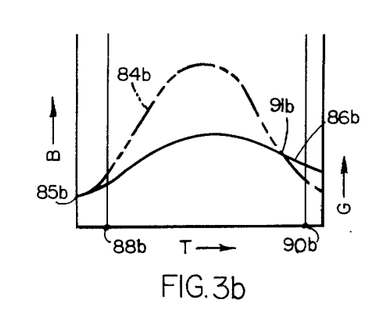

Since the light intensity in FIG. 3a was assumed to be constant, the conductance of the photocell is at what may be termed its equilibrium value for that intensity. As previously mentioned, there is associated with conventional photocells a time lag between changes in the intensity of light incident on the photocell and the corresponding change in the value of the variable electrical property thereof. When the scene being photographed is illuminated by light from photoflash apparatus the intensity of the light changes more rapidly than the equilibrium value of the variable electrical property of the cell. The actual value of the electrical property of the photocell at any given time during the change in intensity therefore will not correspond to the equilibrium value at that time. In FIG. 3b curve 84b represents the intensity of light received from a scene illuminated by photoflash apparatus, with respect to time. The point 85b represents the value of ambient scene brightness before light is received from the photoflash apparatus. The curve 86b represents the actual value of conductance of the same photocell as in the example of FIG. 3a when exposed to the light represented by curve 84b. Since the scales of the graphs in both FIGS. 3a and 3b are the same, a curve representing the equilibrium value of conductance of the cell exposed to the light represented by curve 84b would be a curve superimposed on curve 84b. Consequently, the difference between curves 84b and 86b indicates the difference between the equilibrium and the actual values of conductance corresponding to the changing light intensity represented by curve 84b. If an exposure is initiated and the timing circuit is actuated to begin the timing operation at the time represented by point 88b, the output voltage of the circuit will rise at a rate determined by the photocell conductance. When the time-integral of conductance (that is, the area under curve 86b beginning the time 88b) reaches a predetermined value, which occurs at time 90b, the circuit triggers and exposure is terminated. The duration of the exposure is determined by the actual value of conductance, which in the case of FIG. 3b does not reflect the equilibrium value of conductance corresponding to the light received from the scene. Since the circuit has been calibrated by adjustment of variable resistor 68 to provide proper exposures for the film when the conductance is at its equilibrium value, the exposure provided in the example of FIG. 3b, will be incorrect. The amount of error in the exposure may be expressed as the difference between the areas under curves 84b and 86b between points 88b and 90b. It may readily been seen that the amount of light received during the exposure interval is in excess of the amount required for proper exposure of the film, thus resulting in overexposure. This error is directly related to the speed of response of the photocell used in the timing circuit. The present invention is concerned with eliminating or minimizing this error.

The speed of response of most photocells is related to the amount of change in the intensity of light to which the cell is exposed. That is, when the intensity is raised by a relatively large increment the electrical property of the photocell changes more rapidly towards its equilibrium value than when the intensity is changed by a small increment. The intensity of light received from a scene illuminated by photoflash apparatus varies inversely with the square of the distance from the photoflash apparatus to the scene illuminated thereby. It is a common practice to mount photoflash apparatus upon the camera with which an exposure is made of the scene illuminated by the apparatus. It is therefore assumed for the purposes of the present discussion that the photoflash apparatus, the photocell and the film being exposed are all equidistant from the scene being photographed.

Since the speed of response is associated with a drop as well as a rise in the intensity of light incident on the cell, the actual value of conductance drops more slowly than the intensity of light from the photoflash apparatus. For this reason, curves 84b and 86b cross at the point indicated by 91b and the actual value of cell conductance is then higher than its equilibrium value for the light intensity at that time. Hence, during the time after the curves cross at 91b the amount of light "measured" by the photocell is in excess of that actually present. This would tend to lessen the amount of overexposure somewhat, but in many cases the exposure has been terminated before the time at which the curves cross is reached. In any case, as a practical matter the error in the direction of underexposure (when actual conductance is higher than the equilibrium value) is never enough to balance the error in the direction of overexposure (when actual conductance is lower than the equilibrium value).

It is apparent from the foregoing description that a photographic shutter may be so constructed that the duration of exposures effected thereby will be determined by the time-integral of an electrical property of a timing circuit which is a part of, or operatively associated with, the shutter. For a given film speed and exposure aperture size, proper exposure is effected by a particular time-integral of light intensity during the exposure interval. Since the electrical property may be functionally related to light intensity, a proper exposure may be obtained by the operation of the timing circuit if this functional relationship does not change from one exposure to the next, or during the exposure interval. When the intensity of light changes more rapidly than the electrical property, however, the functional relationship is not the same and exposure errors result.

Figure 3C:
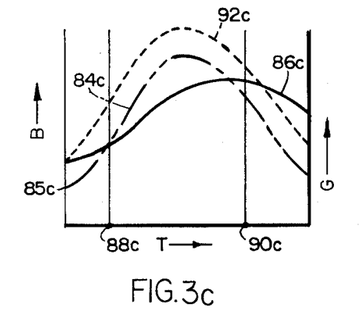

In FIG. 3c, curve 84c is a duplication of curve 84b from FIG. 3b; that is, the intensity of light with respect to time is exactly the same in both figures. Also, the numeral 85c represents the level of ambient illumination, as in the previous example. Curve 92c represents the equilibrium value of photocell conductance corresponding to the light intensity value represented by curve 84c. Although the functional relationship between photocell conductance and light intensity is obviously not the same in the example of FIG. 3c as in FIG. 3b, the speed of response of the cell is the same. Thus, when the photocel of FIG. 3c is exposed to light having the intensity with respect to time represented by curve 84c, the actual conductance of the cell with respect to time is indicated as curve 86c.

Since the circuit responds to the actual conductance of the cell, if the circuit is actuated to begin timing at 88c, triggering will occur at 90c, when the time-integral of actual cell conductance reaches the predetermined value which is the same as in the previous examples. The ideal value of cell conductance with respect to time would be represented by a curve superimposed on the intensity-time curve, as in the example of FIG. 3a, or any other curve which, when integrated between the limits 88c and 90c, would be equal to the integral of curve 84c between the same limits. Although curve 86c is not superimposed on curve 84c during the exposure interval (i.e., from 88c to 90c), it is found that the areas under the two curves (time-integrals) during this time are very nearly equal.

Figure 3D:
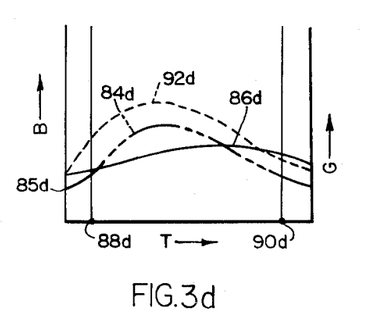

FIG. 3d illustrates a changing light intensity which is somewhat lower than that of FIGS. 3b and 3c. The intensity is represented by curve 84d, the equilibrium value of photocell conductance corresponding to this light intensity by curve 92d, and the actual value of conductance of the cell when exposed to this light by curve 86d. The functional relationship between cell conductance and light intensity, and the speed of response of the cell are the same in FIG. 3d as in FIG 3c. Since the increment by which the light intensity is changed is less in FIG. 3d than in FIG. 3c, the actual value of conductance changes toward its equilibrium value more slowly. The circuit is actuated at 88d and triggers at 90d, when the area under curve 86d reaches the required value. Light intensity, and hence cell conductance, is lower in FIG. 3d than in FIG. 3c; accordingly, the exposure interval is longer. Thus, the time-integral of conductance during the exposure interval is still substantially the sameas the time-integral of light intensity, during the same interval because, although the difference between actual and ideal conductance is greater while light intensity is rising, it is also greater when the intensity drops and the longer exposure interval takes both into account.

It is of importance to note that the various curves of FIGS. 3a–3d are used merely as a convenient means of explaining circuit operation in relation to light intensity and to illustrate the effect of photoconductive lag. Light intensity may be plotted as a function of time and, if the functional relationship between light intensity and conductance and the speed of response of the cell are known, conductance may also be plotted as a function of time. Proper exposure will be provided when the time-integral of light intensity during the exposure interval (shown in (2) above) is equal to $$\frac{A^2 K}{S_x}$$

where A is the area of the aperture through which light enters to expose the film, $S_x$ is the speed of the film being exposed, and K is a dimensional constant. Therefore, when aperture size and film speed are known the proper time-integral of light intensity may be calculated. Since the functional relationship between intensity and conductance is also known, the proper time-integral of conductance may also be calculated. The circuit is then calibrated to trigger, thus causing termination of exposure, when the time-integral of conductance reaches the value so calculated beginning at the time when the circuit is actuated to start the timing operation. Although it is shown in FIGS. 3a–3d that exposure is initiated and terminated simultaneously with actuation and triggering, respectively, of the circuit, the mechanical operation of the shutter may be synchronized with circuit operation in any convenient manner so long as the relationship between the time-integral of conductance required to trigger the circuit and the time-interal of light intensity from opening of the shutter to closing thereof in response to circuit triggering is properly established and maintained.

It may thus be seen from a consideration of the foregoing discussion in connection with FIGS. 3a–3d that improper exposures will result either when the light intensity is constant or when it changes during the exposure interval, depending on how the circuit is calibrated, if the speed of response of the photocell is not taken into account. If the circuit is set to trigger and thus provide proper exposure when the light intensity is constant with respect to time, as in FIG. 3a, overexposure will result when the device is operated when the light changes substantially during the exposure interval, as in FIG. 3b. If the functional relationship between light intensity and ideal (or equilibrium) conductance is that indicated by curves 84c and 84d, and by curves 92c and 92d, the actual conductance when the cell is exposed to such light (curves 86c and 86d) results in a proper, or nearly proper, exposure. However, if this functional relationship were retained and the device operated with light of constant intensity, the resulting exposure would be effected when there is no lag time associated with the operation of the photocell during the exposure interval and the relationship between the actual conductance and light intensity would not be the same as when light intensity changes, as described above.

Figure 4:
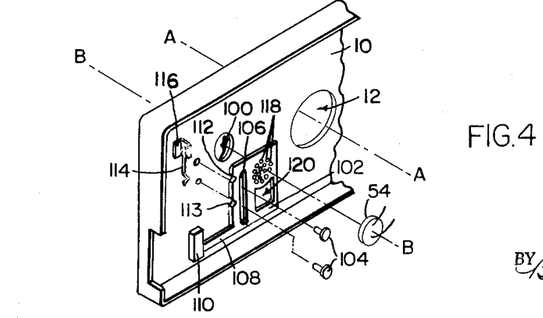
FIG. 4 is an exploded perspective view of selected elements of photographic apparatus incorporating the present invention.

An example of suitable means for solving this problem in accordance with the present invention is shown in FIG. 4. The fragment 10 of FIGURE 1 is seen as a front wall of a shutter housing or camera body having therein exposure aperture 12 with axis A—A. Photocell aperture 100 is disposed adjacent exposure aperture 12 so that photocell 54, which is disposed behind aperture 100, receives light from a scene which is photographed through aperture 12. Opaque plate 102 is movably mounted between photocell 54 and aperture 100 upon pins or rivets 104 which extend through elongated slot 106 in plate 102. Arm 108 extends from plate 102 and terminates in manually engageable button 110 which is positioned in an easily accessible position outside the shutter or camera housing. A pair of notches 112 and 113 are formed in one edge of plate 102. Notches 112 and 113 are engageable by detent spring 114 which is fixedly mounted upon block 116 on front wall 10.

It may thus be seen that by manual movement of button 110, plate 102 may be moved between a first position, wherein detent spring 114 engages notch 112, and a second position, wherein spring 114 engages notch 113. When in the first position, the portion of plate 102 which is positioned between photocell 54 and aperture 100 has a plurality of small openings 118 therein. Thus, when plate 102 is in the first position the light which passes through aperture 100 to impinge upon photocell 54 is partially obscured or attenuated by plate 102 since only that portion of the light which passes through openings 118 strikes photocell 54. A portion of plate 102 is cut away to form large opening 120 which is positioned between aperture 100 and photocell 54 when plate 102 is in the second position. Consequently, when plate 102 is in the second position, the light passing through aperture 100 is allowed to impinge upon photocell 54 without attenuation. The functional relationship between the intensity of available light from the scene being photographed and the value of the variable electrical property of the photocell is obviously changed by moving plate 102 between its first and second positions. For example, when the photocell is of the photoconductive type, for the same constant intensity of light from the scene, the conductance of the cell will be higher when plate 102 is in the second position than when it is in the first position.

Relating the operation of the apparatus of FIG. 4 to the illustrative graphs of FIGS. 3a–3d, when light intensity from the scene is that shown by curve 84a the conductance of photocell 54 is represented by curve 86a when plate 102 is in the second position, that is, when the light is attenuated before striking the photocell. If plate 102 were moved to the first position while light intensity remained the same, the conductance would then be shown by curve 92a since a greater amount of the scene light would be allowed to impinge upon the photocell. Since the circuit has been calibrated, as previously described, to provide proper exposure when the conductance is that shown by curve 86a, it is evident that plate 102 should be in the second position if proper exposure is to result.

If plate 102 remains in the second position while a scene illuminated by photoflash apparatus is photographed the result will be that explained in connection with FIG. 3b. Although the ideal or equilibrium conductance when plate 102 is in the second position falls in the same place on the graph as the light intensity, the actual conductance is represented by curve 86b due to photoconductive lag. If, however, plate 102 is moved to the first position, so that the light may strike the photocell without attenuation, the equilibrium conductance is that shown by curve 92c of FIG. 3c when the scene is illuminated by photoflash apparatus. The actual conductance, when photoconductive lag is taken into account, is that shown by curve 86c. Since the circuit has not been recalibrated, and the exposure aperture and film speed are also the same as for constant light intensity, proper exposure results when the time integral of light intensity is substantially equal to the time-integral of photocell conductance during the exposure interval. As previously explained in connection with FIG. 3c, from the time the circuit is actuated to begin timing and the shutter moves to initiate exposure at 88c to the time when the circuit triggers and exposure is terminated at 90c, the time-integral of light intensity is equal or substantially equal to the time-integral of conductance. The same is true in the example of FIG. 4d.

It is therefore apparent that proper exposures may be automatically provided in accordance with the present invention both when the intensity of scene light is substantially constant and when it varies substantially, as when photoflash apparatus is used. The invention also takes into account the speed of response to variations in light intensity which is present in conventional photocells which are otherwise suitable for photographic applications. It is necessary, of course, to attenuate the light by a proper amount in the second position of plate 102 when the invention is practiced with apparatus such as that shown in FIG. 4. This amount may easily be determined for a particular photocell by calibrating the circuit to provide proper exposure when photoflash apparatus is used and light from the scene strikes the photocell without attenuation, then attenuating the light by the amount required for proper exposure with the circuit so calibrated and light intensity constant.

The above-described results may also be obtained by means other than those shown in FIGS. 1 and 4. The physical structure of the shutter is unimportant so long as means are provided to initiate and terminate exposure in synchronization with operation of a timing circuit which includes a photoresponsive device. It is also evident that synchronization must be provided between operation of the circuit, the shutter mechanism and the flashlamp, where the latter is used to illuminate the scene being photographed. The foregoing discussion of the operation of the invention has obviously assumed that, although there may be some delay between circuit and shutter operation, both the time interval established by the circuit and the exposure interval established by movement of the shutter blades are at least partially effected while the light from the photoflash apparatus is changing rapidly in intensity. Since both the nature and methods of effecting such synchronization are well known to those skilled in the art and are not concerned in any novel or unusual manner with the present invention, a discussion thereof is omitted. The means provided to compensate for the speed of response of the photocell may be substantially as shown in FIG. 4, or variations may be employed. For example, rather than using an opaque plate having a plurality of openings therein as a means of attenuating the light which strikes the photocell, an optical filter, movable between first and second positions for varying the amount of light attenuation, could be employed. It is also possible, although probably more expensive, to provide two photocells arranged in parallel in the circuit of FIGURE 1 in place of the single cell 54 shown. In this case, one of the photocells may be completely masked, as by covering with an opaque plate, when the light intensity is substantially constant and unmasked when photoflash apparatus is to be used. The functional relationship between scene light intensity and circuit conductance may thus be varied to compensate for the speed of response of the photocells in the same manner as by partial masking of one cell when light intensity is constant.

The present invention may conveniently be used in conjunction with previously known means for changing exposure variables with respect to light intensity to allow for differences in film speeds, to change the range of brightness levels within which the device is operable, to correct for nonlinearity in the relationship between condistance and light intensity, etc. Numerous examples of such means may be found in the prior art and include various baffle and filter arrangements adapted to provide continuous variation of the portion of scene light which is allowed to impinge upon the cell. Such devices may be set to a desired position and allowed to remain there while the means of the present invention are moved between first and second positions to compensate for photoconductive lag or the like.

Since certain changes may be made in the above apparatus and process without departing from the scope of the invention herein involved, it is intended that all matter contained in the above description or shown in the accompanying drawings shall be interpreted as illustrative and not in a limiting sense.

What is claimed is:

1. In a photographic camera, an exposure timing circuit including photoresponsive means having an electrical property which varies in magnitude in accordance with the intensity of light incident on said photoresponsive means, said circuit comprising:
   first actuating means selectively operable to initiate a time interval;
   second actuating means operable to terminate said time interval in response to the time integral of said electrical property, commencing at initiation of said time interval, reaching a predetermined value;
   said photoresponsive means being characterized by having a time lag between a change in the intensity of light incident thereon and the corresponding change in the value of said electrical property, whereby said time integral of said electrical property bears different relationships to the time integral of the intensity of light incident on said photoresponsive means when said intensity is substantially constant and when said intensity varies; and
   compensating means movable between a first position, when the intensity of light incident on said photoresponsive means is substantially constant during said time interval, and a second position, when the intensity varies during said time interval, movement of said compensating means from said first to said second position being effective to establish a relationship between said time integral of said electrical property and said time integral of light intensity incident on said photoresponsive means which is substantially the same when said intensity varies during said time interval as when said intensity is constant during said time interval.

2. A photographic camera according to claim 1, in which the compensating means comprises an adjustably positioned light-attenuating means so arranged that light from the scene is attenuated before reaching the photoresponsive means in at least one position of the light-attenuating means.

3. A photographic camera according to claim 2, in which the light-attenuating means has a first position, for use when the scene is to be photographed with the aid of a flashbulb, in which it does not attenuate light directed towards the photoresponsive element from the scene, and a second position, for use when the scene is to be photographed in ambient light, in which it attenuates light travelling from the scene towards the photoresponsive means.

4. A photographic camera according to claim 3, in which the light-attenuating means comprises an opaque plate having a number of apertures which are positioned between the photoresponsive means and light from the scene when the attenuating means is in its second position.

5. In a photographic camera having an exposure aperture and shutter means movable with respect to said aperture to initiate and terminate exposures therethrough both when the scene being photographed is illuminated by ambient light and when it is illuminated by light from photoflash apparatus, the combination comprising:
   first means for actuating said shutter means to initiate said exposure;
   a photosensitive element arranged to receive light from said scene and having an electrical property which is functionally related to the intensity of said light;
   timing means adapted, upon actuation thereof, to establish a time interval which terminates when the time-integral of said electrical property, after initiation of said time interval, reaches a predetermined value;
   second means for actuating said timing means to initiate said time interval;
   third means for actuating said shutter means to terminate said exposure in response to termination of said time interval;
   means for so synchronizing operation of said first, second and third means and movement of said shutter means that the time from initiation to termination of said exposure is a function of said time-integral of said electrical property;
   said photoresponsive element being characterized by having a time lag between changes in the intensity of light incident thereon and the corresponding change in the equilibrium value of said electrical property, whereby the relationship between said time-integral of said electrical property and the time-integral of the intensity of light incident thereon is a first relationship when said scene is illuminated by ambient light and a second relationship when illuminated by light from photoflash appartus; and means selectively movable between a first position, wherein said time-integral of said electrical property reaches said predetermined value at a desired time when said first relationship exists, and a second position, wherein said time-integral of said electrical property reaches said predetermined value at substantially said desired time when said second relationship exists.

6. The invention according to claim 5 wherein, when said second relationship exists, the time-integral of the actual value of said electrical property when said last-named means is in said second position is substantially equal to the time-integral of the equilibrium value of said electrical property when said last-named means is in said first position.

7. The invention according to claim 6 wherein said last-named means comprise light-attenuating means selectively positionable between said element and said light whereby the light incident on said element when attenuated is substantially equal to said known fraction of the light incident on said element when unattenuated.

8. A photoresponsive timing circuit comprising:
electrically capacitive means;
first switching means operable to change the electrical charge on said capacitive means with respect to time;
a photosensitive element having an electrical property which is determined by the intensity of light incident on said element in such a may that the time-integral of said electrical property bears a first relationship to the time-integral of the intensity of said light when said intensity is substantially constant and a second relationship when said intensity is changing;
said photosensitive element being so arranged with respect to said capacitive means that the time-rate of change of said electrical charge is a function of the value of said electrical property whereby the instant at which said charge reaches a predetermined value is a function of the time-integral of said electrical property;
second switching means operable in response to said charge reaching said predetermined value; and
means for so adjusting said circuit between a first setting when said intensity is substantially constant and a second setting when said intensity is changing that said predetermined value is reached at substantially the same instant that said time-integral of intensity reaches a given value under either condition.

9. A photoresponsive timing circuit comprising:
an electrical power source;
electrically capacitive means;
first switching means so arranged with respect to said power source and said capacitive means that upon operation of said first switching means the charge on said capacitive means changes with respect to time;
second switching means operable in response to said charge reaching a preselected value, whereby said circuit establishes a time period beginning with operation of said first switching means and ending with operation of said second switching means;
at least one photoresponsive element having an electrical property the value of which is functionally related to the intensity of light incident on said element, and so arranged in said circuit that time required for said charge to reach said preselected value is a function of the time-integral of said electrical property during said time period;
said photoresponsive element being characterized by having a time delay between changes in said intensity and corresponding changes in the value of said electrical property whereby said time-integral of said electrical property bears a first relationship to the time-integral of said intensity when said intensity is substantially constant during said time period and a second relationship when said intensity is changing during said time period; and means for adjusting relationship between said preselected value and said time-integral of said electrical property between a first relationship when said intensity is substantially constant and a second relationship when said intensity is changing, whereby said time period corresponds in either case to said time-integral of said intensity.

10. Means for automatically establishing the exposure value of a photographic shutter whereby a predetermined amount of light is admitted by said shutter irrespective of changes in the intensity of said light during the exposure, said means comprising, in combination:
first means operable to initiate a photographic exposure;
a photoresponsive timing circuit including a photosensitive element arranged to receive light from the scene being photographed and having an electrical property which is functionally related to the intensity of said light, said element being characterized by having a time delay between changes in said intensity and the corresponding change in said electrical property;
means for actuating said circuit to begin said time period;
means for causing said circuit to switch a current supply, the time between actuation and switching of said circuit being determined by the electrical parameters thereof, means for terminating said exposure in response to switching of said circuit, and means for varying at least one of said electrical parameters from a first value when said exposure is to be made with light of substantially constant intensity during the exposure interval and a second value when said exposure is to be made with light of continuously changing intensity during the exposure interval.

11. An automatic exposure control device comprising:
means defining an exposure aperture through which light from the scene being photographed enters to effect the exposure;
shutter means for uncovering and covering said aperture to initiate and terminate said exposure;
means for actuating said shutter means to initiate said exposure, a photoresponsive timing circuit;
first switching means for actuating said circuit to cause a current to flow through a portion thereof;
second switching means for causing said circuit to switch off said current through said portion;
means responsive to said second switching means for actuating said shutter means to terminate said exposure, the time between operation of said first and second switching means being a function of the electrical properties of said circuit, one of said properties being variable in response to changes in the intensity of said light from said scene and characterized by having a time lag between changes in said intensity and the corresponding change in said electrical property; and
means for varying at least one of said electrical properties from a first value when said light is of constant intensity during exposure to a second value when said light is of changing intensity during exposure, whereby the time-integral of the intensity of said light from said scene, from initiation to termination of exposure, is substantially constant each time an exposure is effected.

12. In a camera having an exposure aperture and shutter means movable with respect to said aperture to initiate and terminate exposures therethrough both when the scene to be photographed is illuminated by ambient light and when it is illuminated by light from photoflash apparatus, means for effecting automatic control of the exposure duration as a function of the time-integral of average scene brightness, said means comprising, in combination:

a timing circuit including switching means actuatable to initiate a time period wherein said circuit controls a flow of electrical current;

a photosensitive element arranged to receive light from said scene and having an electrical property which is a function of the intensity of said light;

said photosensitive element being characterized by having a delay time between changes in the intensity of light incident thereon and the corresponding change in the equilibrium value of said electrical property, whereby the actual value of the time-integral of said electrical property is a known fraction of the equilibrium value of said time-integral of said electrical property when said element is exposed to light from photoflash apparatus;

means for so incorporating said element into said circuit that said time period is terminated in response to said time-integral of said electrical property reaching a predetermined value, whereby the duration of said time period is a function of said time-integral of said electrical property;

means for synchronizing initiation of said time period with initiation by said shutter means of an exposure, and for synchronizing termination of said time period with termination of said exposure, whereby the duration of said exposure is a function of the duration of said time period; and means for controlling the portion of said light incident on said element, said last-named means being movable between first and second positions whereby the portion of light incident on said element when in said first position is substantially equal to said known fraction of the portion incident on said element when in said second position.

13. In a photographic camera having an exposure aperture and shutter means movable with respect to said aperture to initiate and terminate exposures therethrough, means for automatically controlling the duration of the exposures as a function of the time-integral during exposure of the intensity of light from the scene being photographed, both when said light is of substantially constant intensity and when it is provided by photoflash apparatus, said means comprising, in combination:

first actuating means operable to actuate said shutter means to initiate an exposure;

a photoresponsive timing circuit adapted, upon actuation, to establish a time period which varies in duration as a function of the time-integral of an electrical property of said circuit, and to provide an electrical actuation at the termination of said time period;

second actuating means operable to actuate said timing circuit to initiate said time period in synchronism with initiation of said exposure;

a photosensitive element arranged to receive light from said scene and comprising said electrical property of said circuit, said property being functionally related to the intensity of light incident on said element, whereby for each value of light incident on said element there is an associated equilibrium value of said electrical property;

said element being characterized by having a time delay between changes in the intensity of light incident on said element and the corresponding change in said associated equilibrium value, whereby the time-integral of the actual value of said electrical property when said scene is illuminated by photoflash apparatus it a fraction of the time-integral of the equilibrium value of said electrical property for the corresponding intensity of light when said scene is so illuminated;

third actuating means operable in response to said electrical actuation and in synchronism therewith to actuate said shutter means to terminate said exposure; and light attenuating means selectively movable between a first position, wherein light from said scene is attenuated by a first amount before being incident on said element, and a second position, wherein light from said scene is attenuated by less than said first amount before being incident on said element, said first amount being such that when said attenuating means is in said first position and said scene is illuminated by light of substantially constant intensity the time-integral of said electrical property bears substantially the same relationship to the time-integral of light intensity as when said attenuating means is in said second position and said scene is illuminated by photoflash apparatus.

14. The invention according to claim 13 wherein said light attenuating means comprise an opaque plate having therein a plurality of apertures which are positioned between said element and light from said scene when said attenuating means is in said first position.

15. The invention according to claim 14 wherein said attenuating means is movable to said second position in response to the installation of photoflash apparatus upon said camera.

16. In a photographic camera having an exposure aperture and shutter means movable with respect to said aperture to initiate and terminate exposures therethrough, means for automatically controlling the duration of the exposures as a function of the time-integral during exposure of the intinsity of light from the scene being photographed, both when said light is of substantially constant intensity and when it is provided by photoflash apparatus, said means comprising, in combination:

a timing circuit including switching means actuatable to initiate a time period wherein said circuit controls a flow of electrical current;

a photosensitive element arranged to receive light from said scene and having an electrical property which is a function of the intensity of said light;

said photosensitive element being characterized by having a delay time between changes in the intensity of light incident thereon and the corresponding change in the equilibrium value of said electrical property, whereby the actual value of the time-integral of said electrical property is a known fraction of the equilibrium value of said time-integral of said electrical property when said element is exposed to light from photoflash apparatus;

means for so incorporating said element into said circuit that said time period is terminated in response to said time-integral of said electrical property reaching a predetermined value, whereby the duration of said time period is a function of said time-integral of said electrical property;

means for synchronizing initiation of said time period with initiation by said shutter means of an exposure, and for synchronizing termination of said time period with termination of said exposure, whereby the duration of said exposure is a function of the duration of said time period;

first aperture means positionable between said element and light from said scene;

second aperture means positionable between said element and light from said scene; and means for selectively relatively moving said first and second aperture means and said element between first and second relative positions, whereby the portion of said light incident on said element is defined by said first aperture means when in said first relative position, and by said second aperture means when in said second relative position.

17. The invention according to claim 16 wherein said first aperture means is fixedly positioned between said element and light from said scene, and said second aperture means is selectively movable to an aperture position between said element and light from said scene wherein the portion of light incident on said element is defined by said second aperture means.

18. The invention according to claim 17 wherein said second aperture means comprises an opaque plate having therein a plurality of apertures which are positioned between said element and light from said scene when said second aperture means is in said operative position.

References Cited by the Examiner

UNITED STATES PATENTS

| | | | |
|---|---|---|---|
| 2,179,717 | 11/39 | Fedotoff | 95—60 |
| 3,020,816 | 2/62 | Frenk | 95—58 |
| 3,056,332 | 10/62 | Beregowtiz | 95—10 |

NORTON ANSHER, *Primary Examiner.*